(12) United States Patent
Zorn

(10) Patent No.: US 6,519,948 B2
(45) Date of Patent: Feb. 18, 2003

(54) INSULATED CONTAINER

(75) Inventor: Manfred Zorn, Hungen-Inheiden (DE)

(73) Assignee: IPV Inheidener Produktions-und Vertriebagesellschaft mbH, Hungen-Inheiden (DE)

(*) Notice: Subject to any disclaimer, the term of this patent is extended or adjusted under 35 U.S.C. 154(b) by 0 days.

(21) Appl. No.: 09/847,335

(22) Filed: May 3, 2001

(65) Prior Publication Data

US 2002/0026798 A1 Mar. 7, 2002

(30) Foreign Application Priority Data

May 3, 2000 (DE) .................................. 200 07 909 U
Nov. 3, 2000 (DE) .................................. 200 18 873 U

(51) Int. Cl.[7] .............................................. F25B 21/02
(52) U.S. Cl. ........................... 62/3.6; 62/3.62; 62/457.1
(58) Field of Search ........................ 62/3.2, 3.6, 3.61, 62/3.62, 371, 383, 451.1, 457.7

(56) References Cited

U.S. PATENT DOCUMENTS

| | | | | |
|---|---|---|---|---|
| 5,099,649 A | * | 3/1992 | Zorn | ........................... 62/3.61 |
| 5,603,220 A | * | 2/1997 | Seaman | ........................... 62/3.7 |
| 6,260,360 B1 | * | 7/2001 | Wheeler | ........................... 62/3.6 |

FOREIGN PATENT DOCUMENTS

| | | | | |
|---|---|---|---|---|
| DE | 40 31 029 A1 | 4/1992 | ............ | B60H/1/32 |
| DE | 41 02 646 A1 | 8/1992 | ............ | B60N/3/10 |
| DE | 31 50 362 C2 | 6/1993 | ............ | F25B/21/02 |
| DE | 295 10 920 U1 | 12/1995 | ............ | A45F/3/02 |
| DE | 297 16 137 U1 | 1/1998 | ............ | F25B/21/02 |
| DE | 694 05 504 T2 | 2/1998 | ............ | F25B/21/02 |
| DE | 197 28 539 A1 | 1/1999 | | |
| DE | 198 38 833 A1 | 3/2000 | ............ | F25D/29/00 |
| JP | 5-264153 A | * 10/1993 | ................ | 62/3.62 |

* cited by examiner

Primary Examiner—Denise L. Esquivel
Assistant Examiner—Melvin Jones
(74) Attorney, Agent, or Firm—Jacobson Holman PLLC

(57) ABSTRACT

The invention relates to an insulated container, particularly a cooler bag, for the refrigerated transportation of foods, substances and/or articles, having a jacket surrounding a transportation space or area and a closable opening is provided in the jacket for accessing the transportation space. According to the invention the insulated container is characterized in that in the transportation space is received an active cooling device with a heat exchange device, that in the jacket there is at least one recess and that the recess is constructed for receiving and passing to the outside the heat exchange device.

42 Claims, 5 Drawing Sheets

INSULATED CONTAINER

BACKGROUND OF THE INVENTION

1. Field of the Invention

The invention relates to an insulated container for the refrigerated transportation of foods, substances and/or articles having a jacket surrounding a transportation space or area, a closable opening being provided for accessing the transportation space in the jacket.

2. Prior Art

Such insulated containers are known and are e.g. used as cooler bags in the leisure sector or as shopping bags for deep-frozen foods.

Such bags delay heating of introduced cooled products or foods. Using passive cooling elements it is also possible to precool the transportation space and in this way, following the insertion of the foods in the precooled transportation space, a cooling is obtained.

Such insulated containers are more particularly used as cooling containers for cooling foods, e.g. travel provisions. However, it is also possible to use insulated containers in the medical or clinical sector, e.g. for cooling medicaments or blood products.

The passive cooling elements comprise materials with a high heat capacity and/or high transition or latent heat for a solid-liquid phase transition. After a certain time the temperature of the passive cooling elements adapts to the ambient temperature, so that their cooling potential is exhausted and they must be cooled down again, e.g. in the freezing compartment of a refrigerator. In the case that such a cooling possibility is not available, the use of such passive cooling elements is disadvantageous, because after heating to ambient temperature they only represent useless ballast.

DE 197 28 539 A1 discloses active cooling devices, in which a volume is cooled e.g. by Peltier elements, i.e. by electric current. However, these cooling elements are not usable together with the known insulated containers, because in the latter there is no possibility of dissipating to the outside the heat extracted from the transportation volume.

In addition, in the case of the cooler bag known from DE 197 28 539 A1, a flexible foldable jacket is provided, so that the bag volume can be adapted to the given needs. This known cooler bag can only be designed with a relatively small transportation area or space for manual use. Even in the case of a comparatively small size and correspondingly low weight of the cooler bag, a manual transportation thereof, particularly if longer distances have to be covered, is very arduous and fatiguing.

The object of the present invention is to provide an insulated container permitting the use of passive and active cooling devices. In addition, the insulated container should be easy and inexpensive to manufacture.

A further object of the invention is to provide an insulated container for manual use, which permits a particularly effective cooling and which is also particularly light and easy to transport by hand over longer distances.

SUMMARY OF THE INVENTION

This object is achieved by an insulated container having a jacket, which surrounds a transportation area or space and in which a closable opening is provided for accessing the transportation space in the jacket and in said transportation space can be received an active cooling device with a heat exchange device and the jacket has at least one recess constructed for the reception and passage to the outside of the heat exchange device.

Appropriate developments of the invention are given in the subclaims.

A fundamental idea of this first aspect of the invention is to provide an insulated container with a recess or opening for receiving a heat exchange device of an active cooling device. Therefore the heat removed from the transportation space to be cooled by an inserted cooling element can be dissipated to the outside. Thus, use can be made of the advantages of active cooling. For example, through the use of an active cooling device cooling can take place at any desired time. In addition, the insulated containers according to the invention are characterized by particularly simple and inexpensive manufacture. Thus, the recess can be made in a conventional container, e.g. by simply punching or cutting.

In a second aspect of the invention an insulated container of the aforementioned type is further developed in that at least one active cooling device with an active cooling element and a heat exchange device is received in the transportation space, that the cooling device has a jacket for receiving foods, substances and/or articles, that in the jacket there is at least one recess and the recess is constructed for the reception and passing to the outside of the heat exchange device.

According to the invention the heat exchange device of the cooling device, which can e.g. be constructed in the form of cooling ribs, is placed in the recess and projects through it to the outside, which permits heat dissipation from the inside to the outside. The cooling element of the cooling device can be a thermoelectric cooling unit or element, particularly a Peltier element.

The bag, which is appropriately provided with a closable opening, can also be referred to as an inner jacket or bag and correspondingly the jacket can be referred to as an outer jacket or bag.

In a third aspect of the invention an insulated container of the aforementioned type is further developed in that at least one active cooling device with an active cooling element and a heat exchange device is received in the transportation space, that the cooling device has a bag for receiving foods, substances and/or articles, that in the jacket is provided at least one recess, which is constructed to receive and pass to the outside the heat exchange device and that the jacket is firmly or detachably coupled to a manually operable rolling device, which has at least two rollers, as well as a guide device.

A fundamental idea of this third aspect of the invention is that the jacket is coupled to a travelling or moving device, particularly a rolling device. In this way a user can easily move or roll the insulated container and need no longer carry it by hand for transportation purposes. According to the invention the jacket is firmly or detachably coupled to the manually operable rolling device. The detachable variant has the additional advantage that the moving device only has to be coupled to the jacket when it is actually required, i.e. if the insulated container is to be manually transported over a certain distance, whereas if this is not the case the jacket can be used without said moving device.

In a particularly preferred embodiment of the invention the moving device is constructed as a rolling device with at least two rollers and also a guide device. A user can control the movement of the insulated container with the aid of the guide device.

The guide device appropriately has two telescopable guide elements, particularly made from metal, and a handle connected thereto. The telescopability or possibility of drawing in and out the guide elements, which can e.g. be constructed as guide rods, advantageously permits a space-saving housing of the moving or rolling device if the latter is not required. Particular preference is given to an embodiment with two rollers, in which for movement purposes the insulated container is initially slightly tilted with the aid of the handle and the extracted guide rods or elements and can then be moved by pulling or pushing on the handle.

It is appropriate to select the weight or mass distribution on the rolling device in such a way that a torque around a roller axis is as small as possible, so that for stabilizing the rollable cooling container only limited force has to be used by the user.

The active cooling device represents a significant part of the total mass or weight of the movable cooling container. The active cooling device is consequently preferably placed on the rolling device in such a way that in manual rolling operation it is located on a side of a roller axis facing the centre of gravity of a transported product. In this way the torques resulting from the transported product and active cooling device are at least partly mutually compensated.

It is particularly appropriate to so position the active cooling device that when the cooling container is parked, i.e. is in the untilted state, it is essentially located vertically above a roller axis.

Another preferred embodiment of the invention is characterized in that the active cooling device is positioned between the two telescopable guide elements. In this way the active cooling device is advantageously protected against mechanical action and damage.

For obtaining particularly good cooling the bag and/or jacket can have a thermally insulated construction. These measures lead to a particularly good thermal insulation and a significant contribution thereto can be made by an air layer between the racket and the bag.

Particular preference is given to constructions of the invention in which only one of the components, i.e. the bag and the jacket have a thermally insulating construction. Thus, either a very good thermally insulating inner bag is inserted in a simply constructed outer bag or conversely a simply constructed, e.g. film-like inner bag is received in a very good thermally insulating outer bag.

To bring about an adaptation of a volume to be cooled and therefore an energy saving, the bag or inner bag can be made from a flexible, in particular foldable material.

For the use of the insulated container it is also possible for the bag or inner bag to be made from an antibacterially acting material.

To prevent an escape of condensation water in the jacket or outer bag, the bag or inner bag is preferably made from water-impermeable material, particularly from a polyethylene or polyvinyl chloride material.

In the above-described case where a thermally insulating inner bag is received in a non-thermally insulating outer bag, the advantage is obtained that very simply constructed e.g. film-like outer bags are used and as a result manufacturing costs can be reduced. In particular, the outer bag need not be tight to water, air or heat, i.e. even sewn outer bags can be used.

For adapting the transportation space and therefore the volume to be kept cool, the outer bag or jacket can be made from a flexible, particularly foldable material.

In an appropriate construction of the insulated container a covering device is provided for closing the recess when required. The insulated container can then also be used without an inserted cooling device, which leads to a significant weight saving. In the case of a thermally insulating construction of the jacket, the insulated container can also be used as a cooler bag, which can be completely adequate when lower cooling demands are made, e.g. with respect to the cooling period or temperature.

However, the use of the insulated container is not limited to that of a cooler bag. It is also possible to e.g. keep hot hot foods in said insulated container. If essentially the use as a cooler bag together with an inserted cooling device is intended, the jacket need not be constructed in thermally insulating manner. In this case the jacket or outer bag can be separately used as a transportation container. Thus, the functionality of the insulated container can be significantly increased by the covering device.

A further improvement to cooling can be brought about if the heat flow from the outside into the transportation space is reduced. One measure for achieving this consists of the recess being constructed for positive reception of the heat exchange device of the cooling device. It is also appropriate in this connection to provide on a border of the recess a sealing device for thermal insulation purposes and said sealing device can be constructed as a bead or a plurality of beads from an elastic material.

In order to ensure a secure transportation of the foods and/or articles in the bag, it is advantageous for a fastener to be provided for fixing the cooling device within the transportation space. This fastening device can be a Velcro fastener or an engaging connection.

The covering device can also be constructed as a flap connected to the jacket. As a result the covering device is always connected to the insulated container and need only be swung away if a cooling device is to be inserted in the transportation space. If the insulated container is to be used without a cooling device, it is advantageous to provide a connecting mechanism for fixing the flap. This can once again be constructed as a Velcro or zip fastener or as an engaging connection.

It can also be advantageous to have several, in particular two recesses in the outer jacket. Then, e.g. two cooling devices with in each case one bag can be inserted in the insulated container. It is then possible to produce different cooling temperatures in the two bags, e.g. normal cooling at 8∅C and low-temperature cooling at temperatures below freezing point.

For the protection of the heat exchange device of the cooling device projecting outwards through the recess and for the protection of a user, it is also possible to have at least one lining element, which at least partly covers the heat exchange device.

For the detachable connection of the lining element to the jacket or heat exchange device, once again it is possible to have a Velcro fastener or engaging connection.

A preferred development of the insulated container according to the invention is characterized in that the jacket is constructed in multi-wall form, particularly in two-wall form as an inner jacket and an outer jacket. As a result of a two-wall jacket it is possible with limited constructional effort and expenditure to bring about a much better thermal insulation and therefore an energy and cost saving.

Appropriately the jacket, particularly the inner and/or outer jacket is at least partly made from thermally insulating material.

In a construction with inner and outer jacket it is also possible to separably connect the inner jacket to the outer jacket. The inner jacket can e.g. be removed from the outer jacket for cleaning purposes.

There can also be a fastening device for the detachable fastening of the inner jacket within the transportation space to the outer jacket, the fastening device advantageously being constructed as at least one Velcro fastener or at least one engaging connection, e.g. a press stud connection.

It is also possible to provide several different inner jackets for the same outer jacket.

The volume to be effectively cooled plays an important part with respect to energy consumption. For the variable adaptation of this volume, i.e. the transportation space volume, the jacket, particularly the inner and/or outer jacket, can at least partly be made from flexible, especially foldable material. In this way only the actually required volume is cooled and energy consumption can consequently be reduced.

For further improving the thermal insulation, the jacket, particularly the inner and/or outer jacket, can be provided on an inside and/or outside with a thermal radiation-reflecting layer. The thermal radiation-reflecting layer can be constructed as a metal coating and/or metal foil and a metal foil can e.g. be bonded or laminated on. This effectively prevents with simple means a penetration of thermal radiation into the transportation space and consequently the heating thereof.

The inner jacket is preferably made from a water-impermeable material, particularly a polyethylene or PVC material. Such a preferably removable inner jacket can easily be cleaned and also advantageously prevents dirtying of the outer jacket.

For special uses, e.g. for sterile, cooled transportation in the medical or clinical sector, it is also possible for the inner jacket to be made from an antibacterially acting material and/or for it to be coated with an antibacterially acting substance.

With a view to a particularly effective cooling of the transportation space, it is advantageous if at least part of the active cooling device, particularly a heat exchange device, projects through an opening in the transportation space. It is also possible for the active cooling device to completely cover from the inside and/or outside said opening. Preference is given to a construction in which a first part of an active cooling device is inserted in a hole punched or cut from the jacket and is subsequently screwed, riveted or otherwise joined to a heat exchange device on the inside of the jacket in the transportation space. It is also possible to have a reverse construction with an active cooling device located in the interior of the transportation space and an externally positioned heat exchange device. It is also possible to have both inside the transportation space and on the outside a heat exchange device.

The active cooling device can be constructed as a Peltier cooling element, which can in particular be designed for a supply voltage of 12 V.

It is appropriate if for the detachable connection of the active cooling device to a power supply, particularly for connection to a 12 V car battery, a connecting device is provided. This gives an easily manually transportation cooling container, which can also be very easily connected to a car battery for precooling or further cooling. Such an insulated container is eminently suitable for use in the leisure sector, e.g. for cooling travel provisions.

For housing the connecting device, which is in particular a connecting cable with a coupling plug connected thereto, appropriately between the telescopable guide elements is provided a reception space for the protected reception of the connecting device.

For reducing energy consumption for cooling purposes it is appropriate to keep as small as possible the volume to be effectively cooled. It is also frequently desired to fix transportation product housed in the transportation space and/or to permanently stabilize a compressed or reduced form of the transportation space. For reducing the jacket volume there is preferably provided a reducing or folding device, which can in particular be in the form of compression straps.

If a particularly good setting of a transportation temperature in the transportation space is desired, it is also possible to provide a temperature regulating device in the transportation space. It must also be stressed in this connection that the transportation container according to the invention although mainly used as a cooling container, can instead also be used for the temperature-controlled transportation of substances, articles and/or materials at temperatures higher than ambient temperature.

Further advantages and features of the insulated container according to the invention are described hereinafter by means of diagrammatic representations of embodiments.

BRIEF DESCRIPTION OF THE DRAWINGS

The invention is described in greater detail hereinafter relative to an embodiment illustrated in the attached drawings, wherein show.

BRIEF DESCRIPTION OF THE DRAWINGS

Figure 1:
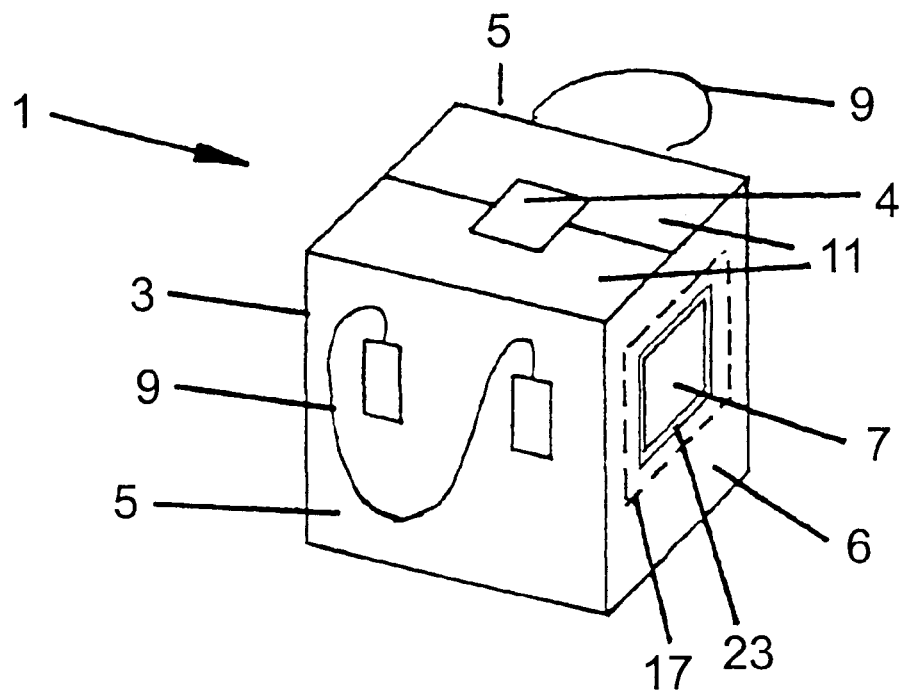
FIG. 1 A perspective view of an insulated container according to the invention.

FIG. 1 shows an insulated container, constructed as a cooler bag 1, according to the present invention. The cooler bag 1 has a jacket 3 with four side walls 5, 6, a top and a bottom. For carrying the cooler bag 1 are provided two holding loops 9 fixed to two facing side walls 5. Access to an inside transportation space or area is permitted by two covers 11, which can be swung out on the top of the cooler bag 1. In a swung closed state shown in FIG. 1, the covers 11 are closed with a bolt means 4. In a further side wall 6 is formed a recess or opening 7 shaped in such a way that a heat exchange device 13 of an active cooling device 15 (cf. FIG. 2) can be positively received. For further improving the thermal insulation on a border of the recess 7 is provided a sealing device 23 in the form of a rubber bead. For covering the recess 7 is provided a covering device 17 in the form of a flap movably connected to the outer jacket 3 and which is shown in broken line form in FIG. 1. The flap can be fixed to the jacket 3 by means of an engaging connection not shown in the drawing.

Figure 2:
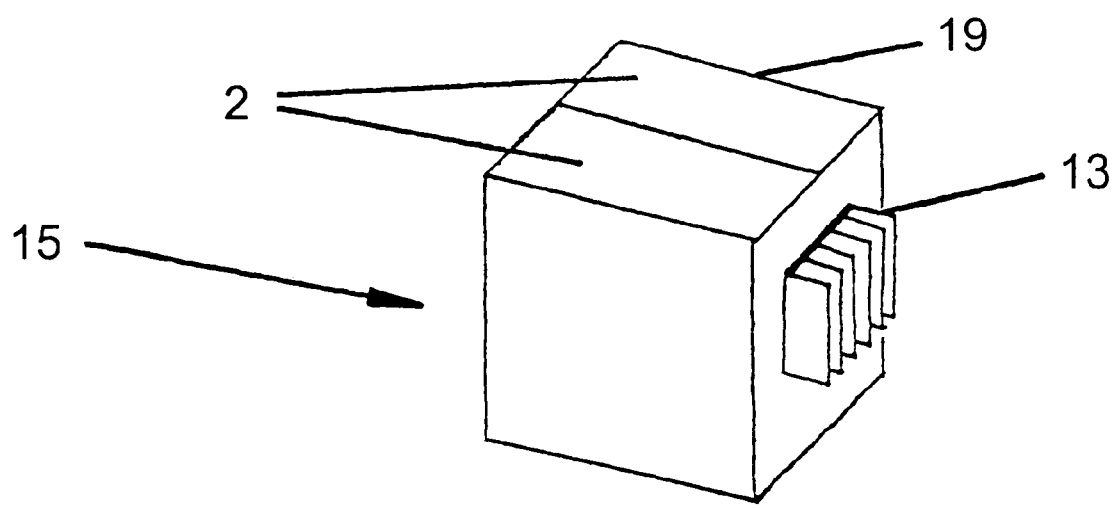
FIG. 2 A perspective view of an active cooling device with a heat exchange device.

FIG. 2 shows an active cooling device 15 insertable in the cooler bag 1 of FIG. 1. The cooling device 15 has a not shown active cooling element in the form of a Peltier element, as well as cooling ribs as the heat exchange device 13. The cooling device 15 is also provided with a flexible, thermally insulating bag 19, which fully surrounds a volume to be cooled. To permit access to the volume to be cooled located in the interior of the bag 19, there are two swing out cover flaps 2, which are shown in a closed state in FIG. 2.

Figure 3:
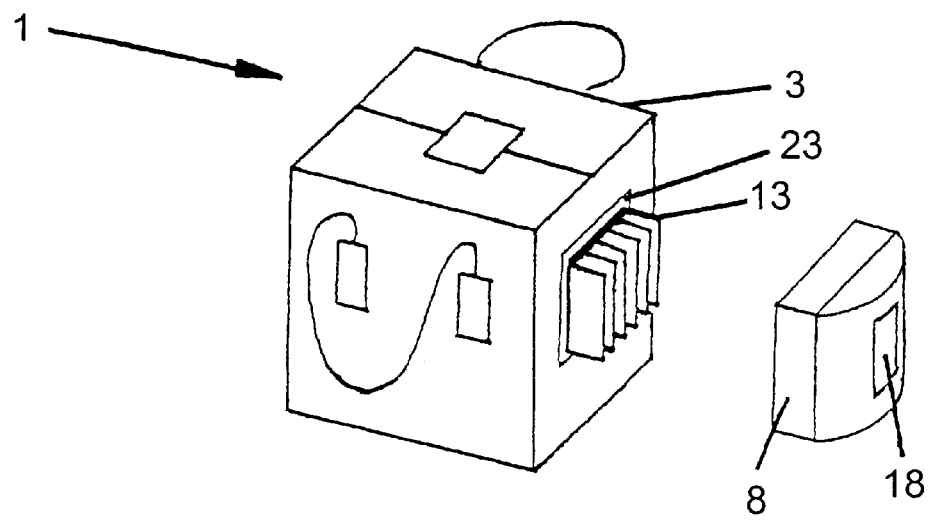
FIG. 3 A perspective view of the insulated container of FIG. 1, in which is inserted the cooling device of FIG. 2.

FIG. 3 shows the cooler bag 1 according to FIG. 1 with a cooling device 15 according to FIG. 2 received in the transportation space of the jacket 3. The cooling ribs acting as the heat exchange device 13 project through the recess 7 of the cooler bag 1 from the inside to the outside and in this way permit a clearly defined heat conduction from the inside to the outside. The sealing device 23 constructed as a rubber bead ensures a very good thermal insulation between the exterior and the transportation space. The thermal insulation between the volume to be cooled by the active cooling device 15 and the exterior is also improved by the thermally insulating jacket 3, the thermally insulating bag 19 and also the air layer between jacket 3 and bag 19.

FIG. 3 also shows a lining element 8 in a removed state and which for the partial covering of the heat exchange device 13 can be placed over the latter. Through the use of the lining element 8 it is possible to protect the heat exchange device 13 against damage and also a user against injury. A heat exchange between the exterior and the cooling ribs of the heat exchange device 13 is made possible when the lining element 8 is fitted by an opening 18 in said lining element 8. By means of a Velcro fastener not shown in the drawing the lining element 8 can be fastened to the jacket 3.

Figure 4:
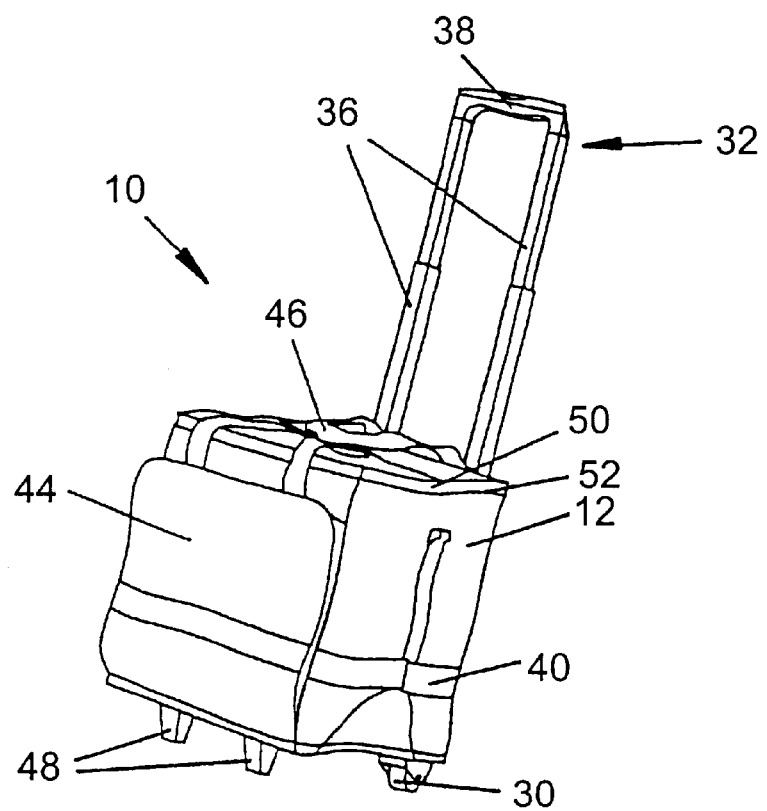
FIG. 4 A perspective view of an insulated container according to the invention in a ready-to-roll state.
Figure 5:
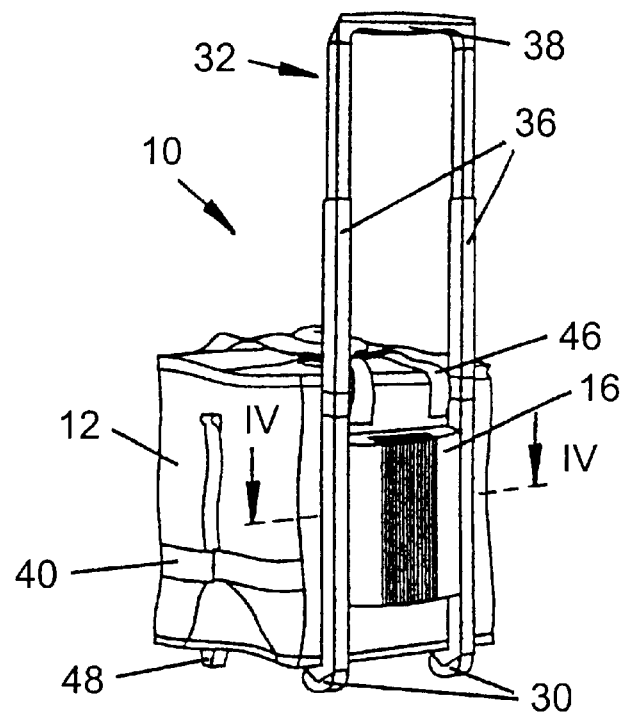
FIG. 5 A further perspective view of the insulated container of FIG. 4 in a parked state.

FIGS. 4 and 5 show in perspective views an insulated container 10 according to the invention and which essentially comprises a jacket 12, an active cooling device 16 and a moving or travelling device. The moving device is constructed as a rolling device and has two rollers 30 and a guide device 32, provided with two telescopable guide elements or rods 36 and a handle 38.

FIGS. 4 and 5 show the guide device 32 with in each case extended guide rods 36. The handle 38 is fitted between the upper ends of both guide rods 36. In each case one roller 30 is fitted to a lower end of the guide rod 36.

Figure 9:
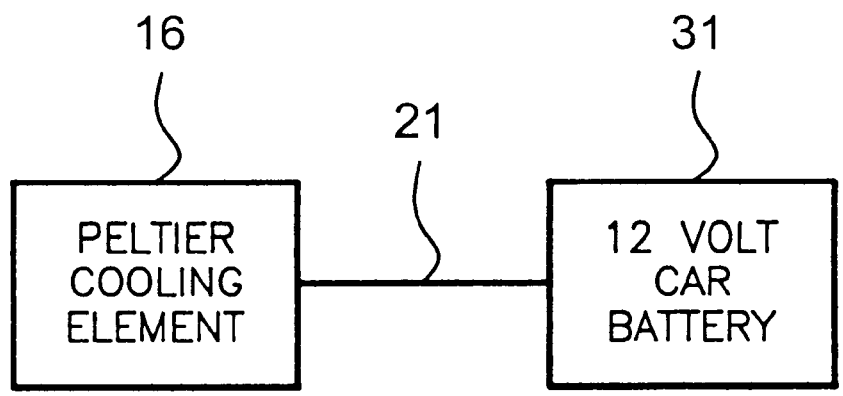
FIG. 9 A schematic diagram of a cooling element being connected by a conventional connecting device to a car battery.

The active cooling device 16 is located on a back of the jacket 12 between the two guide rods 36. The active cooling device 16 is protected against mechanical action and damage by the guide rods 36, which are preferably made from metal, especially aluminium. With reference to FIG. 9, the active cooling device 16 is a Peltier cooling element 16, which is provided with a terminal or connection 21 for a 12 V battery 31.

The jacket 12, which in the embodiment shown is made from flexible, foldable plastics material, has a closable access opening for accessing the transportation space 14 (cf. FIG. 4) surrounded by the jacket 12. In the situation shown in the drawings the access opening is closed by a cover flap 50, which is connected to a lower part of the jacket 12 by a diagrammatically represented zip fastener 52. To a top of the jacket 12 are fitted two carrying loops 46 for the manual transportation of the insulated container 10. These carrying loops 46 can e.g. be used if rolling or moving of the insulated container 10 is not possible or if the jacket 12 is separated from the rolling device.

To a front surface of the jacket 12 is fitted an additional bag 44, whose interior is not cooled by the Peltier cooling element 16. This bag 44 can consequently hold articles which do not have to be cooled or temperature-controlled, e.g. picnic cutlery. In addition, round a partial circumference of the jacket 12 is placed a compression strap 40, with the aid of which the volume to be cooled can be adapted to the actual requirements and also transportation products in the transportation space 14 can be stabilized.

FIG. 4 shows the insulated container 10 in a ready-to-roll state, in which the container 10 is slightly tilted and the ground is only contacted by the rollers 30. In this situation the centre of gravity of the Peltier cooling element 16 is on a side of a roller axis defined by the rollers 30 and the centre of gravity of a not shown transportation product housed in the transportation space is on the other side of the roller axis. Thus, the torques about the roller axis brought about by the two masses partly cancel one another out and for stabilizing the insulated container 10 in the position shown in FIG. 4, a user only has to use a limited force.

FIG. 5 shows the rollable insulated container 10 in a parked state. The insulated container 10 is located on the two rollers 30 and on two feet 48, which are fitted to the underside of the jacket 12 opposite to the rollers 30.

Figure 6:
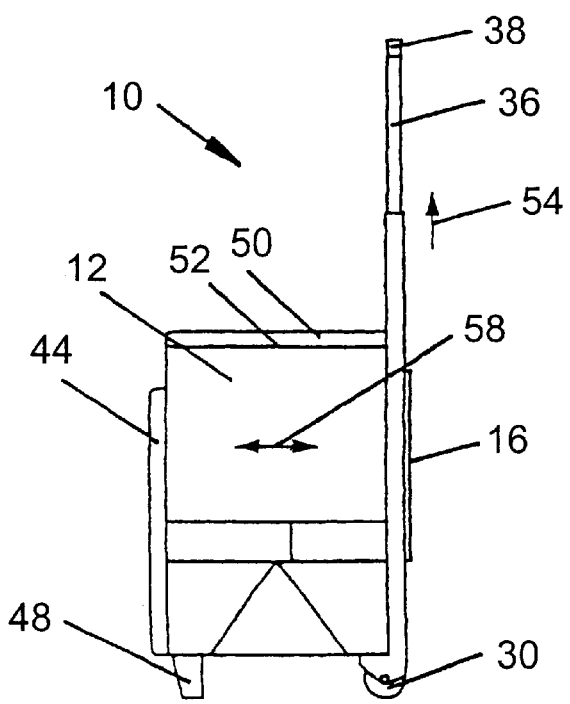
FIG. 6 A diagrammatic side view of the insulated container of FIG. 4 with drawn out jacket and drawn out guide elements of a rolling device.
Figure 7:
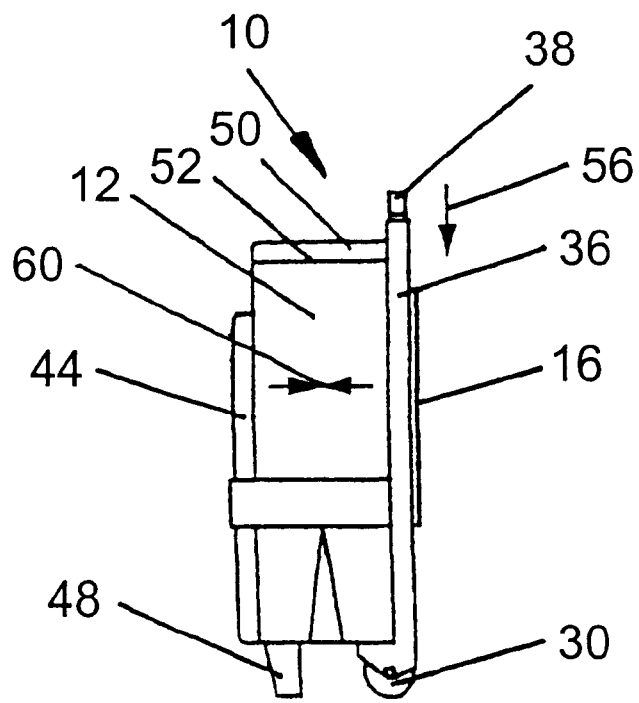
FIG. 7 A diagrammatic side view of the insulated container of FIG. 6 with folded up jacket and drawn in guide elements of the rolling device.

FIGS. 6 and 7 diagrammatically illustrate the foldability of the jacket 12 and the possibility of extracting and inserting the guide rod 36. The same reference numerals as in FIGS. 4 and 5 are used.

FIG. 6 shows the jacket of the insulated container 10 in the furthest extracted state. A movement direction on drawing apart the jacket 12 is indicated by a double arrow 58. In the state shown in FIG. 6 the guide rods 36 are extracted to the maximum, an extraction direction being indicated by an arrow 54.

FIG. 7 shows the insulated container 10 with compressed jacket 12 and drawn in guide rods 36. The corresponding movement directions are once again indicated by a double arrow 60 or by an arrow 56. In this state the insulated container 10 according to the invention can be transported and/or housed in a very space-saving manner.

Figure 8:
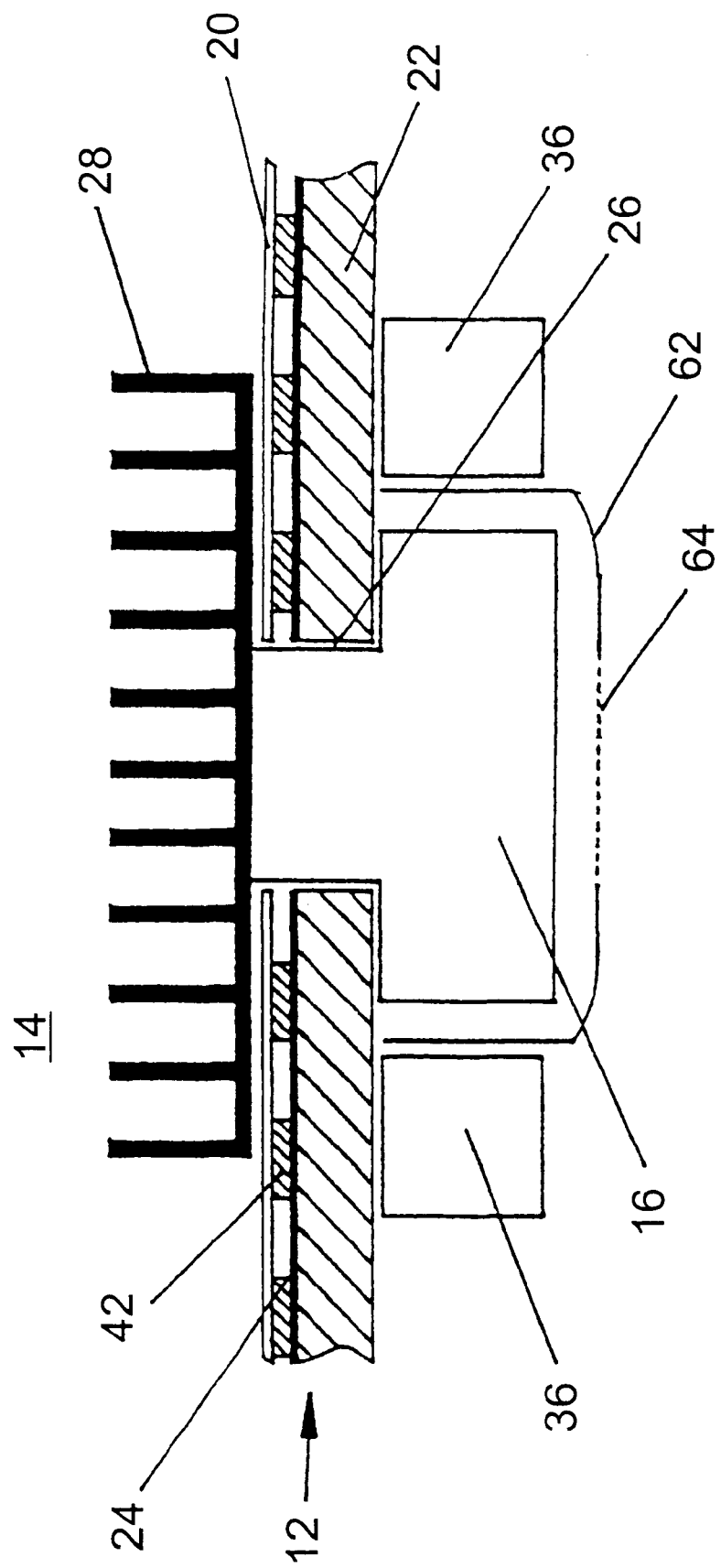
FIG. 8 A partial view of a section along line IV—IV in FIG. 5.

FIG. 8 is a part sectional view along line IV—IV in FIG. 5. Depicted is a two-wall construction of the jacket 12 and the fitting of the Peltier cooling element 16 and once again the same reference numerals as in FIGS. 4 to 7 are used.

In this case the jacket 12 comprises a thin, flexible inner jacket 20 and a flexible outer jacket 22. The inner jacket 20 can e.g. be made from a polyethylene or PVC material and in particular also from a transparent material.

The outer jacket 22 is made from a thicker, thermally insulating material compared with the inner jacket 20 and has on its inside a metal coating 24 for reflecting thermal radiation and which can be in the form of a thin metal foil.

The inner jacket 20 and outer jacket 22 are separably interconnected e.g. by several Velcro fasteners 42, so that the inner jacket 20 can be completely separated from the outer jacket 22, e.g. for cleaning purposes.

An opening 26 is punched, cut or in some other way made in the jacket 12, i.e. in the inner jacket 20 and outer jacket 22 and serves to at least partly receive the Peltier cooling element 16. The opening 26 is constructed for the cooling connection of the Peltier cooling element 16 in a transportation space 14, said opening 26 being completely covered on both sides by said cooling element 16. On the side of the transportation space 14 is provided a heat exchange device 28, which is screwed, riveted or in some other appropriate manner connected to part of the Peltier cooling element 16 located on the outside of the jacket 12.

FIG. 4 particularly clearly reveals the arrangement of the Peltier cooling element 16 between the guide rods 36 through which the Peltier cooling device 16 is protected against damage. Advantageously the Peltier cooling device 16 does not project beyond the thickness of the guide rods 36.

A further damage protection for the Peltier cooling element 16 is provided by a protective covering 62, which is inverted over the cooling element 16 on the outside of the jacket 12. This protective covering, which can e.g. be made of rigid plastic or metal, is provided with a plurality of slits 64 to ensure an adequate heat exchange with the environment.

What is claimed is:

1. An insulated container for the refrigerated transportation of foods, substances and/or articles, the container being provided with a jacket, which surrounds a transportation space, a closable opening being provided in the jacket for accessing the transportation space, the container further comprising:
   an active cooling device with a heat exchange device being received in the transportation space;
   at least one recess being provided in the jacket, the recess being constructed for the reception and passage to the outside of the heat exchange device; and
   a manually operable rolling device, firmly or detachably coupled to the jacket, the rolling device having at least two rollers and a guide device.

2. Insulated container according to claim 1, characterized in that the jacket has a thermally insulated construction.

3. Insulated container according to claim 1, characterized in that the jacket is made from a flexible material.

4. Insulated container according to claim 1, characterized in that the recess is constructed for the positive reception of the heat exchange device of the cooling device.

5. Insulated container according to claim 1, characterized in that on a border of the recess is provided a bead or a plurality of beads made from an elastic material as a sealing device for thermal insulation.

6. Insulated container according to claim 1, characterized in that the jacket is constructed as a carrying or shoulder strap bag, as a rucksack, as a saddle or handlebar bag for bicycles or as a motorcycle box.

7. Insulated container according to claim 1, characterized in that the jacket has a two-wall construction in the form of an inner jacket and an outer jacket.

8. Insulated container according to claim 1, characterized in that on its inside or outside the jacket is provided with a metal coating or with a metal foil as a thermal radiation-reflecting coating.

9. Insulated container according to claim 1, characterized in that the active cooling device is constructed as a Peltier cooling element.

10. Insulated container according to claim 1, characterized in that the active cooling device is constructed as a Peltier cooling element designed for a supply voltage of 12 V and that for the detachable connection of the active cooling device to a 12 V car battery, a connecting device is provided.

11. Insulated container according to claim 1, characterized in that compression straps are provided for reducing the jacket volume.

12. Insulated container according to claim 1, characterized in that a device for regulating the temperature in the transportation space is provided.

13. Insulated container according to claim 1, constructed as a cooler bag.

14. Insulated container for the refrigerated transportation of foods, substances and/or articles, with a jacket surrounding a transportation space, a closable opening being provided in the jacket for accessing the transportation space, characterized in that at least one active cooling device with an active cooling element and a heat exchange device is received in the transportation space, that the cooling device has a bag for receiving foods, substances and/or articles, that there is at least one recess in the jacket and that the recess is constructed for the reception and passage to the outside of the heat exchange device.

15. Insulated container according to claim 14, characterized in that the jacket is coupled firmly or detachably to a manually operable rolling device, which has at least two rollers and a guide device.

16. Insulated container according to claim 14, characterized in that the jacket has a thermally insulated construction.

17. Insulated container according to claim 14, characterized in that the jacket is made from a flexible material.

18. Insulated container according to claim 14, characterized in that the recess is constructed for the positive reception of the heat exchange device of the cooling device.

19. Insulated container according to claim 14, characterized in that on a border of the recess is provided a bead or a plurality of beads made from an elastic material as a sealing device for thermal insulation.

20. Insulated container according to claim 14, characterized in that the jacket is constructed as a carrying or shoulder strap bag, as a rucksack, as a saddle or handlebar bag for bicycles or as a motorcycle box.

21. Insulated container according to claim 14, characterized in that the jacket has a two-walled construction in the form of an inner jacket and an outer jacket.

22. Insulated container according to claim 14, characterized in that on the inside or outside the jacket is provided with a metal coating or a metal foil as a thermal radiation-reflecting coating.

23. Insulated container according to claim 14, characterized in that the active cooling device is constructed as a Peltier cooling element.

24. Insulated container according to claim 14, characterized in that the active cooling device is constructed as a Peltier cooling element designed for a supply voltage of 12 V and that for the detachable connection of the active cooling device to a 12 V car battery, a connecting device is provided.

25. Insulated container according to claim 14, characterized in that compression straps are provided for reducing a jacket volume.

26. Insulated container according to claim 14, characterized in that a device for regulating the temperature in the transportation space is provided.

27. Insulated container according to claim 14, which is constructed as a cooler bag.

28. Insulated container for the refrigerated transportation of foods, substances and/or articles, having a bag, which surrounds a transportation space, a closable opening being provided in the jacket for accessing the transportation space, characterized in that at least one active cooling device with an active cooling element and a heat exchange device is received in the transportation space, that the cooling device has a bag for receiving foods, substances and/or articles, that there is at least one recess in the jacket, that the recess is constructed for the reception and passage to the outside of the heat exchange device and that the jacket is firmly or detachably coupled to a manually operable rolling device having at least two rollers and a guide device.

29. Insulated container according to claim 28, characterized in that the guide device has two telescopable guide elements and a handle connected thereto.

30. Insulated container according to claim 28, characterized in that the guide device has two telescopable guide elements and a handle connected thereto and that the active cooling device is located between the two guide elements.

31. Insulated container according to claim 28, characterized in that the jacket has a thermally insulated construction.

32. Insulated container according to claim 28, characterized in that the jacket is made from a flexible material.

33. Insulated container according to claim 28, characterized in that the recess is constructed for the positive reception of the heat exchange device of the cooling device.

34. Insulated container according to claim 28, characterized in that on a border of the recess is provided a bead or a plurality of beads made from an elastic material as a sealing device for thermal insulation.

35. Insulated container according to claim 28, characterized in that the jacket is constructed as a carrying or shoulder strap bag, as a rucksack, as a saddle or handlebar bag for bicycles or as a motorcycle box.

36. Insulated container according to claim 28, characterized in that the jacket has a two-wall construction in the form of an inner jacket and an outer jacket.

37. Insulated container according to claim 28, characterized in that on its inside or outside the jacket is provided with a metal coating or a metal foil as a thermal radiation-reflecting coating.

38. Insulated container according to claim 28, characterized in that the active cooling device is constructed as a Peltier cooling element.

39. Insulated container according to claim 28, characterized in that the active cooling device is constructed as a Peltier cooling element, which is designed for a supply voltage of 12 V and that for the detachable connection of the active cooling device to a 12 V car battery, a connecting device is provided.

40. Insulated container according to claim 28, characterized in that for reducing of a volume of the jacket compression straps are provided.

41. Insulated container according to claim 28, characterized in that a device for regulating the temperature in the transportation space is provided.

42. Insulated container according to claim 28, which is constructed as a cooler bag.

* * * * *